No. 783,822. Patented February 28, 1905.

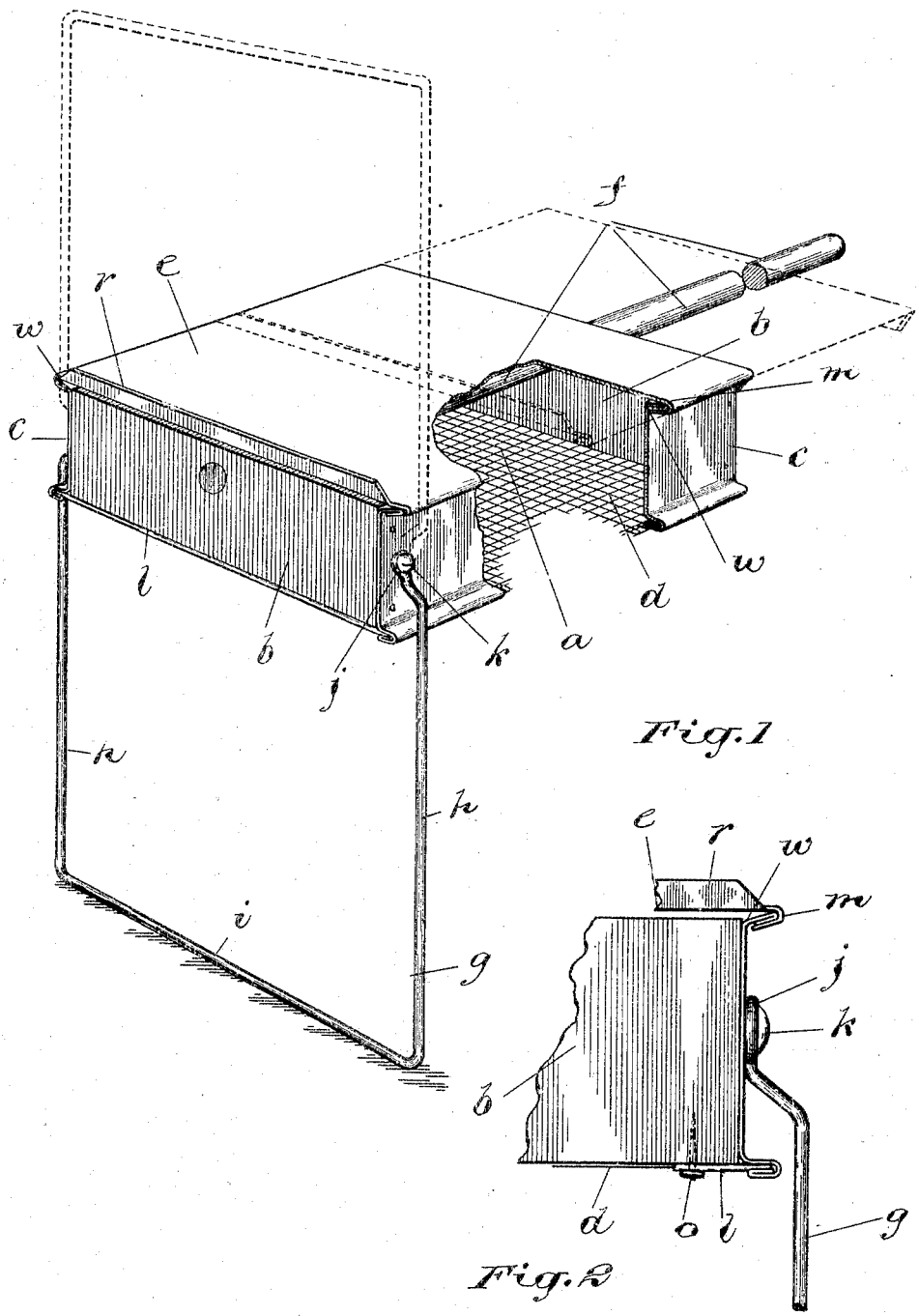

UNITED STATES PATENT OFFICE.

CHARLES DAVIS CUTTS, OF TORONTO JUNCTION, CANADA.

CINDER-SHAKER.

SPECIFICATION forming part of Letters Patent No. 783,822, dated February 28, 1905.

Application filed May 19, 1904. Serial No. 208,686.

*To all whom it may concern:*

Be it known that I, CHARLES DAVIS CUTTS, tinsmith, of the town of Toronto Junction, in the county of York, in the Province of Ontario, Canada, have invented certain new and useful Improvements in Cinder-Shakers; and I do hereby declare that the following is a full, clear, and exact description of the same.

The objects in my invention are to provide a light and rigid cinder-shaker and provide means by which when operating the shaker it will be supported on the ground to take up the weight from the operator, or one end may be suspended by a hook or knob to any suitable means that would allow it to be rocked or oscillated.

For the purposes of supporting or suspending the shaker I provide a bail that is pivoted at one end of the shaker and may be turned under to support one end of the shaker, or it may be turned up, so as to engage with a hook or any suitable means to suspend one end, the other end being free and provided with a suitable handle, by which it is supported and by which the shaker is operated when in use.

The shaker is also provided with a suitable cover slidably arranged on the top of the shaker that may be opened to put in the ashes to be shaken and to be closed, so that when the ashes are being shaken it will prevent the dust from rising and also prevent the ashes from being shaken out of the shaker.

I attain these objects by the device as illustrated in the accompanying drawings, in which—

Figure 1 is a perspective view of the shaker, partially broken away to show the construction. Fig. 2 is a detail elevation.

Like letters refer to like parts throughout the specification and drawings.

The shaker consists, essentially, of a rectangular cinder-receptacle $a$. The receptacle $a$ is made up of the two wooden ends $b$ and the two metal sides $c$, the screen bottom $d$, and the slidable top or cover $e$. The cover $e$ is adapted to slide back and forward to allow communication with the receptacle. Passing through the two ends $b$ and extending outward is a handle $f$, by which the shaker is operated. Fastened to the front ends of the receptacle is a bail or support $g$, which consists of a piece of wire bent at right angles and into a U shape and consisting of the two sides $h$ and the end $i$. The sides $h$ terminate in circular eyes $j$, through which pass into the ends $b$ screws or bolts $k$. Where it is desired to use the bail $g$ to support the shaker, it is turned down and allowed to rest on the ground, where the weight of the shaker is taken up. When it is to be suspended, the bail $g$ is turned upward and placed over a peg or projection in any convenient position on a wall or fence. It will be understood by referring to the drawings that when the bail $g$ is down or to be used as a support the shaker may be oscillated, and when the bail is used to suspend the shaker it will be adapted to shake or rock sidewise as well as oscillate. To use the shaker without the use of the bail as a support or suspender, it may be folded back around the sides of the receptacle, where it will be out of the way.

The screen $d$ is made and fastened in combination with the sides $c$. The ends of the screen $d$ are fastened by a binding $l$, bent on the edges of the wire-netting. In connecting the sides $c$ with the edges of the netting it is first bent on the edges, then bent over on itself, and then bent back at right angles, then bent back again to form a rim $w$, on which the cover slides on. By binding the sides on the edge of the screen it prevents unraveling and also makes a perfectly tight-fitting connection and prevents the screen from separating from the sides. The ends of the screen are fastened to the ends $b$ by tacks $o$ passing through the binding $l$. The cover $e$ has the side edge bent over to form a groove $m$, which partially surrounds the rim $w$, projecting laterally from the sides $c$. Projecting upward at one end of the top $e$ is a flange $p$, by which the top is pulled backward and forward, and depending from the opposite end is a flange $r$, which arrests the forward movement. It will be understood by referring to the drawings that the sides $c$ and the screen $d$ are made integral and that the sides are tacked or fastened to the ends $b$, and the ends of the screen $d$ are tacked to the ends $b$. By this mode of connecting and fastening the different parts together I arrange the parts to avoid loosening or losing its shape.

What I claim as new, and desire to secure by Letters Patent, is—

In a cinder-shaker, a rectangular cinder-receptacle, a top to said receptacle, said top adapted to be opened and closed, a screen bottom to said receptacle, the side edges of said bottom folded in and over on itself along the lower edge of the sides of said receptacle, a flange projecting laterally from the upper edge of the said sides, a flange on the edge of the top adapted to engage with the flange along the edge of said sides, a U-shaped bail pivoted to the sides at one end of the said receptacle, said bail adapted to be bent under or over said receptacle, a suitable handle for operating said sifter passing through the ends of said receptacle, substantially as specified.

In testimony whereof I have signed my name to this specification, in the presence of two subscribing witnesses, at Toronto, this 10th day of May, 1904.

CHARLES DAVIS CUTTS.

Witnesses:
A. S. MACKAY,
S. ALFRED JONES.